US012106263B2

(12) United States Patent
Fu

(10) Patent No.: US 12,106,263 B2
(45) Date of Patent: *Oct. 1, 2024

(54) METHOD FOR LIQUEFIED NATURAL GAS (LNG) STATION MANAGEMENT AND INTERNET OF THINGS SYSTEM THEREOF

(71) Applicant: CHENGDU PUHUIDAO SMART ENERGY TECHNOLOGY CO., LTD., Sichuan (CN)

(72) Inventor: Lin Fu, Chengdu (CN)

(73) Assignee: CHENGDU PUHUIDAO SMART ENERGY TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,997

(22) Filed: Oct. 30, 2023

(65) Prior Publication Data

US 2024/0062144 A1 Feb. 22, 2024

Related U.S. Application Data

(63) Continuation of application No. 18/335,119, filed on Jun. 14, 2023, now Pat. No. 11,861,552.

(30) Foreign Application Priority Data

Jun. 14, 2022 (CN) .......................... 202210669238.8
Apr. 26, 2023 (CN) .......................... 202310461801.7

(51) Int. Cl.
  G06Q 10/0833 (2023.01)
  G06N 3/045 (2023.01)
  G06Q 10/083 (2024.01)

(52) U.S. Cl.
  CPC ......... *G06Q 10/0833* (2013.01); *G06N 3/045* (2023.01); *G06Q 10/0838* (2013.01)

(58) Field of Classification Search
  CPC . G06N 3/045; G06Q 10/0833; G06Q 10/0838
  See application file for complete search history.

(56) References Cited

U.S. PATENT DOCUMENTS 8,490,564 B1 * 7/2013 Shivers, III ............. B63B 27/24
                                                    114/230.17
8,640,493 B1 * 2/2014 Shivers, III .............. F25J 1/005
                                                    114/230.17

(Continued)

FOREIGN PATENT DOCUMENTS

CN       106707928 A       5/2017
CN       109270870 A       1/2019

(Continued)

OTHER PUBLICATIONS

Zhang,Yihao et al., Research on Personalized Recommendation Algorithm Based on Semi-Supervised Learning, Chongqing University Press, 2016, 13 pages.

(Continued)

*Primary Examiner* — Babar Sarwar
(74) *Attorney, Agent, or Firm* — METIS IP LLC

(57) ABSTRACT

The present disclosure discloses a method for liquefied natural gas (LNG) station management and an Internet of Things system. The method includes: acquiring historical gas filling data of a gas station based on a preset acquiring time; determining LNG demand data at at least one future moment and a predicted confidence level of the LNG demand data based on the historical gas filling data through a prediction model; determining a reliable moment based on the predicted confidence level; determining at least one set of candidate delivery plans based on the LNG demand data and LNG storage data; and determining a target delivery plan based on at least one piece of gas filling cost data of the at least one set of candidate delivery plans and the reliable moment.

14 Claims, 5 Drawing Sheets

(56) References Cited

U.S. PATENT DOCUMENTS

| | | | | |
|---|---|---|---|---|
| 8,646,289 B1* | 2/2014 | Shivers, III | ............ | F25J 1/0042 |
| | | | | 114/230.17 |
| 10,013,663 B2* | 7/2018 | Furman | ............. | G06Q 10/0637 |
| 10,260,679 B2* | 4/2019 | Wyllie | .................... | F17C 6/00 |
| 10,515,426 B2* | 12/2019 | Legrand | ................ | G06Q 50/06 |
| 10,731,795 B2* | 8/2020 | Sinatov | ................. | F25J 1/0022 |
| 10,867,261 B2* | 12/2020 | Shao | ................... | G06Q 50/06 |
| 11,397,908 B2* | 7/2022 | Endo | .................... | G05B 15/02 |
| 11,499,679 B2* | 11/2022 | Ando | .................... | B63B 71/00 |
| 2005/0042035 A1* | 2/2005 | de Baan | ................... | F17C 9/02 |
| | | | | 114/294 |
| 2010/0074692 A1* | 3/2010 | Ehrhardt | ................... | F17C 9/02 |
| | | | | 414/803 |
| 2010/0287073 A1* | 11/2010 | Kocis | ................ | G06Q 10/047 |
| | | | | 705/28 |
| 2012/0054201 A1* | 3/2012 | Fischer | ................. | G06F 16/319 |
| | | | | 707/E17.039 |
| 2014/0058572 A1 | 2/2014 | Stein et al. | | |
| 2014/0310049 A1* | 10/2014 | Goel | .................... | G06Q 10/083 |
| | | | | 705/7.24 |
| 2015/0012326 A1* | 1/2015 | Furman | ............... | G06Q 10/067 |
| | | | | 705/7.23 |
| 2015/0324740 A1* | 11/2015 | Shao | ................. | G06Q 10/0633 |
| | | | | 705/331 |
| 2017/0167787 A1* | 6/2017 | Pierre, Jr. | .............. | F25J 1/0277 |
| 2019/0285340 A1* | 9/2019 | Pierre, Jr. | .............. | F25J 1/0221 |
| 2021/0131612 A1* | 5/2021 | Lukawski | ................ | F17C 9/00 |
| 2022/0188220 A1 | 6/2022 | Shailendra et al. | | |
| 2023/0070989 A1 | 3/2023 | Shao et al. | | |
| 2023/0095727 A1 | 3/2023 | Shao et al. | | |
| 2023/0101197 A1 | 3/2023 | Shao et al. | | |
| 2023/0222384 A1 | 7/2023 | Shao et al. | | |
| 2023/0230050 A1 | 7/2023 | Shao et al. | | |

FOREIGN PATENT DOCUMENTS

| | | |
|---|---|---|
| CN | 111275969 A | 6/2020 |
| CN | 111861337 A | 10/2020 |
| CN | 111881677 A | 11/2020 |
| CN | 112428911 A | 3/2021 |
| CN | 113065708 A | 7/2021 |
| CN | 113222230 A | 8/2021 |
| CN | 113741362 A | 12/2021 |
| CN | 114037384 A | 2/2022 |
| CN | 114626643 A | 6/2022 |
| JP | 2019189157 A | 10/2019 |

OTHER PUBLICATIONS

Zhang, Dan et al., Analysis and Study on Architecture of Integrated Smarter Energy Management System, Sino-Global Energy, 12(4): 7-12, 2017.

Lin, Yue et al., A Deep Learning Architecture for Semantic Address Matching, International Journal of Geographical Information Science, 34(3): 559-576, 2019.

Wang, Zizhen et al., Software development of distributed LNG intelligent production and supply system based on Internet of Things, Electronics World, 16: 21-22, 2021.

First Office Action in Chinese Application No. 202210669238.8 mailed on Aug. 1, 2022, 44 pages.

Decision to Grant a Patent in Chinese Application No. 202210669238.8 mailed on Aug. 19, 2022, 8 pages.

* cited by examiner

100

```
┌─────────────────────────────────────────────────────────┐
│ Perceiving and acquiring, by an LNG distributed energy  │
│ intelligent terminal, terminal operation information,   │ ~ 110
│ generating a request for tanking, and sending the       │
│ request to an LNG distributed energy management         │
│ platform                                                │
└─────────────────────────────────────────────────────────┘
                          │
                          ▼
┌─────────────────────────────────────────────────────────┐
│ Obtaining, by the LNG distributed energy management     │
│ platform, vehicle information of an LNG tanker after    │
│ receiving the request, generating a task plan for       │ ~ 120
│ tanking and sending the task plan to the LNG tanker     │
│ and the LNG distributed energy intelligent terminal     │
│ respectively                                            │
└─────────────────────────────────────────────────────────┘
                          │
                          ▼
┌─────────────────────────────────────────────────────────┐
│ The LNG tanker driving to a location of the LNG         │
│ distributed energy intelligent terminal according to    │
│ the task plan, and the LNG distributed energy           │ ~ 130
│ management platform performing real-time tracking and   │
│ monitoring on a driving path of the LNG tanker          │
└─────────────────────────────────────────────────────────┘
                          │
                          ▼
┌─────────────────────────────────────────────────────────┐
│ Initiating, by the LNG tanker, a request for matching   │
│ location after arriving at the location of the LNG      │
│ distributed energy intelligent terminal, completing a   │
│ two-way location matching authentication with the LNG   │ ~ 140
│ distributed energy intelligent terminal through the LNG │
│ distributed energy management platform, and performing  │
│ tanking for the LNG distributed energy intelligent      │
│ terminal                                                │
└─────────────────────────────────────────────────────────┘
```

```
┌─────────────────────────────────────────────────┐
│ Acquiring historical gas filling data of a gas station │ ~ 410
└─────────────────────────────────────────────────┘
                        │
                        ▼
┌─────────────────────────────────────────────────┐
│ Determining LNG demand data at at least one      │ ~ 420
│ future moment based on the historical gas filling│
│                     data                         │
└─────────────────────────────────────────────────┘
                        │
                        ▼
┌─────────────────────────────────────────────────┐
│ Determining at least one set of candidate delivery│ ~ 430
│ plans based on the LNG demand data and LNG       │
│                 storage data                     │
└─────────────────────────────────────────────────┘
                        │
                        ▼
┌─────────────────────────────────────────────────┐
│ Determining a target delivery plan based on at   │ ~ 440
│ least one gas filling cost data of the at least one set│
│              of candidate delivery plans         │
└─────────────────────────────────────────────────┘
```

FIG. 4

METHOD FOR LIQUEFIED NATURAL GAS (LNG) STATION MANAGEMENT AND INTERNET OF THINGS SYSTEM THEREOF

CROSS-REFERENCE TO RELATED APPLICATIONS

This application is a continuation of U.S. application Ser. No. 18/335,119, filed on Jun. 14, 2023, which claims the priority of the Chinese application No. 202210669238.8 filed on Jun. 14, 2022, and the priority of the Chinese application No. 202310461801.7 filed on Apr. 26, 2023, the entire content of each of which is hereby incorporated by reference.

TECHNICAL FIELD

The present disclosure relates to the technical field of liquefied natural gas management, and in particular, to a method for liquefied natural gas (LNG) station management and an Internet of Things system.

BACKGROUND

In August 2021, the Department of Petroleum and Natural Gas of the National Energy Administration and other departments released the "China Natural Gas Development Report (2021)". The report shows that China's diversified supply system of natural gas continues to improve, and the "one network across the country" has basically been formed. A total of 46,000 kilometers of long-distance pipelines have been built, and the total mileage of natural gas pipelines across China has reached about 110,000 kilometers. However, there are still a large number of economically underdeveloped areas such as remote suburbs, counties, mountainous areas, rural areas, and areas with insufficient pipelines, where it is impossible to use safe and clean natural gas with obvious advantages in life and work. According to statistics, nearly 600 million people in China still cannot use natural gas.

However, gas markets in outer suburbs, counties, mountainous areas, and rural areas are potential markets for urban gas. The energy supply in these areas is an integral part of a country's entire energy system, and its supply and consumption will inevitably affect China's energy supply and demand. At present, the focus of urban construction is gradually shifting from the urban area to the outer suburbs, counties, mountainous areas, and rural areas, so it is necessary to establish an efficient, safe, and economical energy supply system. In January 2021, the Central Document No. 1 officially released the policy document "Gas to the Countryside", proposing to "strengthen the construction of public infrastructure in rural areas, promoting the use of gas in the countryside, and supporting the construction of safe and reliable gas storage tank stations and micro-pipe networks of gas in rural areas.

Liquefied Natural Gas (LNG) is now attracting attention as a clean energy source. The combustion of natural gas produces only 50% and 20% of the carbon dioxide and nitrogen oxides produced by combustion of coal, which is ¼ of the pollution of LPG and 1/800 of the pollution of coal. Due to the high investment cost of pipeline laying, LNG gasification station has better economic efficiency than pipeline gas. In small and medium-sized towns, LNG gasification stations can be used as a gas source for residents. In addition, it can also be used for commercial, business, and household heating, etc. By building a virtual pipeline network system, gas can be sent to the countryside to solve the current situation that nearly 600 million people in China still cannot use natural gas.

An LNG gasification station is usually replenished by an LNG tanker. During a process of replenishing, it is required to match the location of the gasification station with the location of the LNG tanker, so as to ensure the accuracy of distribution. However, a traditional address matching manner mainly focuses on a matching relationship between words in an address text, which cannot accurately identify a same point relationship of different addresses under different expressions, and the speed of address matching is relatively slow. Therefore, the traditional address matching manner is no longer suitable for matching massive multi-source heterogeneous address data.

In addition, during the distribution process of the LNG tanker, there is a lack of precise positioning of the LNG tanker and supervision of transportation data, and the safety of LNG transportation needs to be improved.

SUMMARY

The purpose of the present disclosure is to overcome deficiencies of the existing technology by providing a method for liquefied natural gas (LNG) station management and an Internet of Things system. A semantic feature is extracted from an address text by using a deep learning algorithm and deep learning is applied to address matching, which greatly reduces the impact of expression and structure of address on the address matching. At the same time, during the process of transportation, map information is matched to predict a driving direction according to a relative location and moving direction of the LNG tanker, so as to realize monitoring of LNG transportation during the whole process.

First, one or more embodiments of the present disclosure provide a method for liquefied natural gas (LNG) station management, comprising: acquiring historical gas filling data of a gas station based on a preset acquiring time; determining LNG demand data at at least one future moment and a predicted confidence level of the LNG demand data based on the historical gas filling data through a prediction model, wherein the prediction model includes a feature extracting layer, a predicting layer of LNG demand data and a confidence level determination layer, wherein an input of the feature extracting layer includes historical gas filling data acquired at a current moment or historical gas filling data acquired at at least one historical moment, and an output includes a feature embedding vector; an input of the predicting layer of LNG demand data includes the feature embedding vector, and an output includes the LNG demand data at the at least one future moment; and an input of the confidence level determination layer includes the feature embedding vector, gas station distribution information, environmental feature distribution information, the preset acquiring time, and a count of preset future moments, and an output includes the predicted confidence level of the LNG demand data at the at least one future moment; determining a reliable moment based on the predicted confidence level; determining at least one set of candidate delivery plans based on the LNG demand data and LNG storage data; and determining a target delivery plan based on at least one piece of gas filling cost data of the at least one set of candidate delivery plans and the reliable moment.

Second, one or more embodiments of the present disclosure provide an Internet of Things system for liquefied natural gas (LNG) station management, which is realized by the method for liquefied natural gas (LNG) station management, wherein the Internet of Things system includes an energy management platform configured to perform following operations including: acquiring historical gas filling data of a gas station based on a preset acquiring time; determining LNG demand data at at least one future moment and a predicted confidence level of the LNG demand data based on the historical gas filling data through a prediction model, wherein the prediction model includes a feature extracting layer, a predicting layer of LNG demand data and a confidence level determination layer, wherein an input of the feature extracting layer includes historical gas filling data acquired at a current moment or historical gas filling data acquired at at least one historical moment, and an output includes a feature embedding vector; an input of the predicting layer of LNG demand data includes the feature embedding vector, and an output includes the LNG demand data at the at least one future moment; and an input of the confidence level determination layer includes the feature embedding vector, gas station distribution information, environmental feature distribution information, the preset acquiring time, and a count of preset future moments, and an output includes the predicted confidence level of the LNG demand data at the at least one future moment; determining a reliable moment based on the predicted confidence level; determining at least one set of candidate delivery plans based on the LNG demand data and LNG storage data; and determining a target delivery plan based on at least one piece of gas filling cost data of the at least one set of candidate delivery plans and the reliable moment.

Beneficial effects of the present disclosure include that the present disclosure uses a deep learning algorithm to extract a semantic feature from an address text, applies deep learning to address matching, greatly reducing the impact of expression and structure of address on the address matching, and improving the efficiency of LNG tanking by reducing location matching time in the process of LNG tanking.

The beneficial effects of the present disclosure further include that the present disclosure perceives and acquires vehicle-related information in real-time during the transportation process for monitoring, and matches the map to predict a driving direction according to a relative location and moving direction of the LNG tanker, so as to realize monitoring of LNG transportation during the whole process and improve the safety of LNG tanking.

BRIEF DESCRIPTION OF THE DRAWINGS

The present disclosure is further described in terms of exemplary embodiments. These exemplary embodiments are described in detail with reference to the drawings. These embodiments are non-limiting and the same number indicates the same structure in these embodiments, wherein:

FIG. 1 is a flowchart illustrating an exemplary process for managing LNG tanking safety based on location matching according to some embodiments of the present disclosure;

FIG. 4 is a flowchart illustrating an exemplary process for managing a gas station according to some embodiments of the present disclosure;

DETAILED DESCRIPTION

Figure 2:
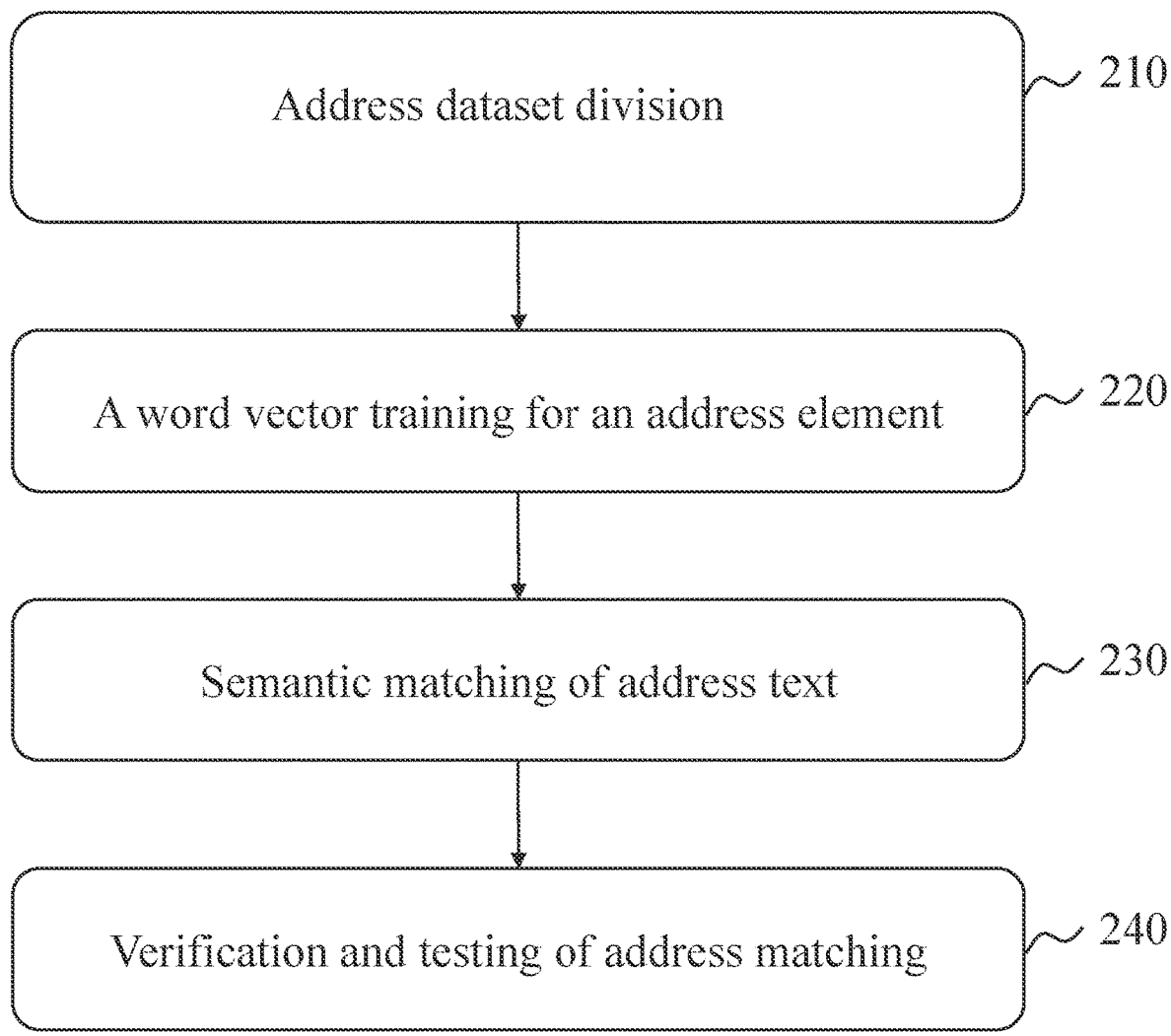
FIG. 2 is a flowchart illustrating a process for performing information matching according to a task plan by an LNG distributed energy management platform according to some embodiments of the present disclosure.

In order to have a clearer understanding of the technical features, purpose, and beneficial effects of the present disclosure, the following detailed descriptions are selected for the technical solutions of the present disclosure. Apparently, the described embodiments are part of the embodiments of the present disclosure, but not all of them, and should not be construed as limiting the applicable scope of the present disclosure. Based on the embodiments of the present disclosure, all other embodiments obtained by people of ordinary skill in the art without creative efforts shall fall within the scope of protection of the present disclosure.

FIG. 1 is a flowchart illustrating an exemplary process for managing LNG tanking safety based on location matching according to some embodiments of the present disclosure.

In this embodiment, as shown in FIG. 1, a method 100 for managing LNG tanking safety based on location matching includes that: step 110: an LNG distributed energy intelligent terminal perceives and acquires terminal operation information, generates a request for tanking, and sends the request to an LNG distributed energy management platform; step 120: the LNG distributed energy management platform obtains vehicle information of an LNG tanker after receiving the request, generates a task plan for tanking, and sends the task plan to the LNG tanker and the LNG distributed energy intelligent terminal respectively; step 130: the LNG tanker drives to a location of the LNG distributed energy intelligent terminal according to the task plan, and the LNG distributed energy management platform performs real-time tracking and monitoring on a driving path of the LNG tanker; step 140: the LNG tanker initiates a request for matching location after arriving at the location of the LNG distributed energy intelligent terminal, completes a two-way location matching authentication with the LNG distributed energy intelligent terminal through the LNG distributed energy management platform, and performs tanking for the LNG distributed energy intelligent terminal.

In this embodiment, step 110 specifically includes that: the LNG distributed energy intelligent terminal perceives and acquires the location information and LNG storage information of the LNG distributed energy intelligent terminal with a perceiving and acquiring device, and generates the request for tanking when LNG storage is lower than a preset alarm threshold, and sends the request and the location information to the LNG distributed energy management platform.

In this embodiment, step 120 specifically includes that: the LNG distributed energy management platform obtains vehicle information of an LNG tanker currently in communication with the LNG distributed energy management platform after receiving the request and location information of the LNG distributed energy intelligent terminal, the vehicle information includes a tank number, vehicle location information, and vehicle speed information; calculates and evaluates a time required for each tanker based on location information and speed information of the each tanker, obtains a tank number and vehicle location information of an LNG tanker with a shortest transportation time from the LNG distributed energy intelligent terminal according to a shortest time matching principle, generates the task plan for tanking, and sends the task plan to the LNG tanker and the LNG distributed energy intelligent terminal respectively.

In this embodiment, the LNG distributed energy management platform performing the real-time tracking and monitoring performed on a driving path of the LNG tanker specifically includes that: the LNG distributed energy management platform pre-plans a path for tanking for the LNG tanker according to the vehicle location information of the LNG tanker and the location of the LNG distributed energy intelligent terminal; selects an inertial reference system as a reference, sets a center of coordinates at a center of the LNG tanker, and constructs driving coordinates of the LNG tanker according to the vehicle location information and vehicle speed information of the LNG tanker; determines an attitude angle and direction information of the LNG tanker based on the driving coordinates of the LNG tanker, divides a total gravitational acceleration of the LNG tanker into several components, and obtains a displacement range of the LNG tanker by adopting an accumulating linear acceleration manner, calculates a directional angle value of the LNG tanker, and introduces measured acceleration components into the driving coordinates to infer a driving direction of the LNG tanker; analyzes and obtains a driving path of the LNG tanker according to the driving direction and the vehicle location information of the LNG tanker, matches a pre-planned path for the tanking and the driving path of the LNG tanker, and issues a path deviation alarm to the LNG tanker if the two paths do not match.

In this embodiment, the two-way location matching authentication includes that: for performing the tanking, the LNG tanker sends request information for tanking and vehicle location information of the LNG tanker corresponding to the LNG distributed energy intelligent terminal to the LNG distributed energy management platform; the LNG distributed energy intelligent terminal sends request information for tanking corresponding to the LNG tanker number and the location information of the LNG distributed energy intelligent terminal to the LNG distributed energy management platform; the LNG distributed energy management platform performs information matching according to the task plan and issues an instruction for tanking to the LNG tanker and the LNG distributed energy intelligent terminal respectively if the matching succeeds; if the matching fails, the LNG distributed energy management platform sends an alarm to a platform manager; after receiving the instruction, the LNG tanker and the LNG distributed energy intelligent terminal open valves for the tanking respectively.

In this embodiment, the information matching performed by the LNG distributed energy management platform according to the task plan specifically includes that: the LNG distributed energy management platform constructs an address matching model and extracts a semantic feature from the location information of the LNG tanker and the location information of the LNG distributed energy intelligent terminal respectively; the LNG distributed energy management platform queries the task plan for tanking stored in a database according to the request information for tanking, and obtains the location information of the LNG distributed energy intelligent terminal and vehicle location information of the LNG tanker in the task plan for tanking; and matches the extracted semantic feature with an address of the task plan for tanking in the database for semantic matching of address text, and outputs a matching result.

FIG. 2 is a flowchart illustrating a process for performing information matching according to a task plan by an LNG distributed energy management platform according to some embodiments of the present disclosure.

In this embodiment, as shown in FIG. 2, a process 200 of the LNG distributed energy management platform constructing an address matching model specifically includes: address dataset division 210: obtaining address data of historical tanking task plans of the LNG distributed energy management platform to form an address database, constructing a set of address data with a manual marking, and dividing the set of address data into a training set, a verification set, and a testing set. The training set is used to train parameters of the model, the verification set is used to adjust and optimize hyperparameters of the model, and the testing set is used to finally evaluate accuracy of the model.

The process 200 further includes a word vector training for an address element 220: using a Word2vec model in a gensim natural language processing library to perform a word vector training for the training set in the address database to obtain a vector expression of a glossary in a current application context and construct an output of the address matching model. The Word2vec model belongs to an unsupervised neural network language model (NNLM), which is essentially a fully connected neural network that may model with a distribution of a current word and its local context to obtain a word vector of the current word. A model used in a training process is a CBOW model, and a training manner is Negative Sampling. Then a glossary of address elements of a corpus and a 256-dimensional word vector corresponding to the corpus are generated.

The process 200 further includes semantic matching of address text 230: using an ESIM mode as a basic model of the semantic matching of address text, where the ESIM model belongs to one of the interaction-based deep text matching models, which combines some features of convolutional neural networks and recurrent neural networks in natural language processing in the model construction, and performs local modeling according to a contextual dependency relation of the address element to complete a task of address matching.

The process 200 further includes verification and testing of address matching 240: performing a verification of address matching on the address matching model according to the verification set. In order to obtain an ESIM model with a best performance, the present disclosure adjusts a count of hidden layer nodes, a learning rate, and a mini-batch size of the model, and selects a set of better parameters based on a combination of the best accuracy of the model on the verification set, the training duration of the model, a convergence speed of a model training loss, and a stability of a prediction accuracy of the model on the verification set. Finally, a testing of address matching is performed with the testing set.

Traditional address matching algorithms mainly focus on using a literal overlap of matching addresses to directly perform a similarity calculation and text matching, which is hardly applicable to a matching task of massive multi-source heterogeneous address data nowadays. Therefore, the present disclosure designs and implements an address matching algorithm based on deep learning. Different from the traditional address matching algorithms, the address matching algorithm based on deep learning focuses on studying a semantic similarity of address text and completes the matching task based on the semantic similarity.

Figure 3:
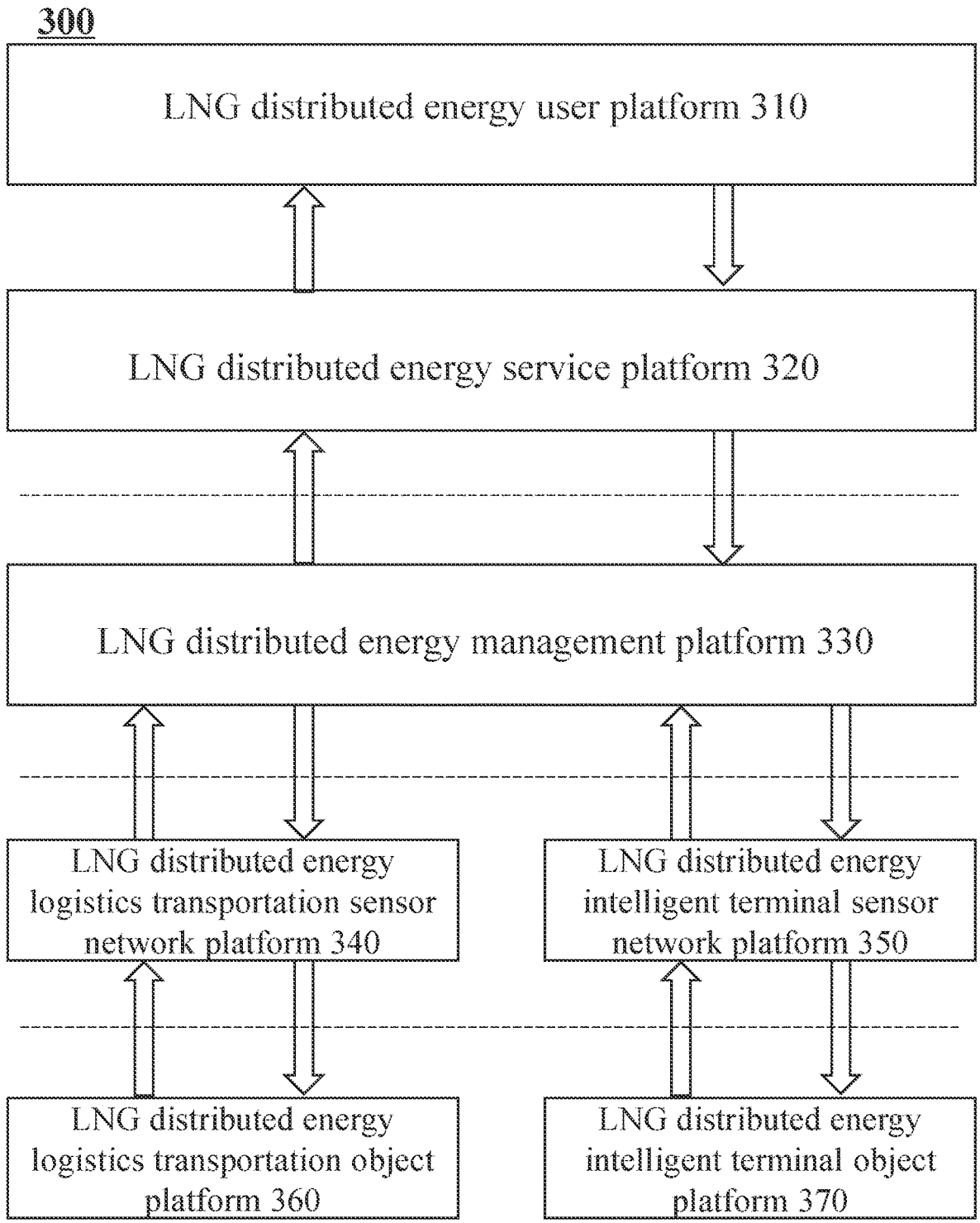
FIG. 3 is a schematic diagram illustrating an exemplary structure of an Internet of Things system for managing LNG tanking safety according to some embodiments of the present disclosure.

FIG. 3 is a schematic diagram illustrating an exemplary structure of an Internet of Things system for managing LNG tanking safety according to some embodiments of the present disclosure.

As shown in FIG. 3, some embodiments of the present disclosure also provide an Internet of Things system 300 for managing LNG tanking safety based on location matching, which is realized by the method 100 for managing LNG tanking safety based on location matching. The Internet of Things system includes an LNG distributed energy user platform 310, an LNG distributed energy service platform 320, an LNG distributed energy management platform 330, an LNG distributed energy logistics transportation sensor network platform 340, an LNG distributed energy intelligent terminal sensor network platform 350, an LNG distributed energy logistics transportation object platform 360 and an LNG distributed energy intelligent terminal object platform 370; the LNG distributed energy logistics transportation object platform 360 and the LNG distributed energy intelligent terminal object platform 370 are configured to perceive and acquire vehicle information of an LNG tanker and terminal operation information of an LNG distributed energy intelligent terminal, generate a request for tanking based on the terminal operation information, and send the request to the LNG distributed energy management platform 330 through the LNG distributed energy logistics transportation sensor network platform 340 and the LNG distributed energy intelligent terminal sensor network platform 350; the LNG distributed energy logistics transportation object platform 360 and the LNG distributed energy intelligent terminal object platform 370 include the LNG tanker and LNG distributed energy intelligent terminal respectively; the LNG distributed energy intelligent terminal perceives and acquires the location information and LNG storage information of the LNG distributed energy intelligent terminal with a perceiving and acquiring device, generates the request for tanking when LNG storage is lower than a preset alarm threshold, and sends the request and the location information to the LNG distributed energy management platform 330; the LNG distributed energy logistics transportation sensor network platform 340 and the LNG distributed energy intelligent terminal sensor network platform 350 are configured to realize a communication connection for perception and control between the LNG distributed energy management platform 330 and the LNG distributed energy logistics object platform 360, and between the LNG distributed energy management platform 330 and the LNG distributed energy intelligent terminal object platform 370; the LNG distributed energy management platform 330 is configured to generate a task plan for tanking based on the acquired vehicle information of the LNG tanker and the terminal operation information of the LNG distributed energy intelligent terminal, and send the task plan to the LNG tanker and the LNG distributed energy intelligent terminal respectively, and perform real-time tracking and monitoring on a driving path of the LNG tanker; the LNG distributed energy management platform 330 is configured to obtain vehicle information of an LNG tanker currently in communication with the LNG distributed energy management platform after receiving the request and location information of the LNG distributed energy intelligent terminal, the vehicle information includes a tank number, vehicle location information, and vehicle speed information; obtain a tank number and vehicle location information of an LNG tanker with a shortest transportation time from the LNG distributed energy intelligent terminal according to a shortest time matching principle, generate the task plan for tanking, and send the task plan to the LNG tanker and the LNG distributed energy intelligent terminal respectively; the real-time tracking and monitoring on a driving path of the LNG tanker performed by the LNG distributed energy management platform 330 specifically includes that: the LNG distributed energy management platform 330 preplans a path for the tanking of the LNG tanker according to the vehicle location information of the LNG tanker and a location of the LNG distributed energy intelligent terminal; selects an inertial reference system as a reference, sets a center of coordinates at a center of the LNG tanker, and constructs driving coordinates of the LNG tanker according to the vehicle location information and vehicle speed information of the LNG tanker; determines an attitude angle and direction information of the LNG tanker based on the driving coordinates of the LNG tanker, divides a total gravitational acceleration of the LNG tanker into several components, and adopts an accumulating linear acceleration manner to obtain a displacement range of the LNG tanker, calculates a directional angle value of the LNG tanker, and introduces measured acceleration components into the driving coordinates to infer a driving direction of the LNG tanker; analyzes and obtains the driving path of the LNG tanker according to the driving direction and vehicle location information of the LNG tanker, and matches a preplanned path for the tanking and the driving path of the LNG tanker, issues a path deviation alarm to the LNG tanker if the two paths do not match; the LNG distributed energy service platform 320 is configured to obtain the vehicle information of the LNG tanker and the terminal operation information of the LNG distributed energy intelligent terminal in a process of LNG tanking required by a user from the LNG distributed energy management platform 330; the LNG distributed energy user platform 310 is configured to obtain the vehicle information of the LNG tanker and the terminal operation information of the LNG distributed energy intelligent terminal from the LNG distributed energy service platform 320 for various users.

Specifically, the LNG tanker initiates a request for matching location after arriving at the LNG distributed energy intelligent terminal, completes a two-way location matching authentication with the LNG distributed energy intelligent terminal through the LNG distributed energy management platform 330, and performs tanking for the LNG distributed energy intelligent terminal; the process of the two-way location matching authentication includes that: for performing the tanking, the LNG tanker sends request information for tanking and vehicle location information of the LNG tanker corresponding to the LNG distributed energy intelligent terminal to the LNG distributed energy management platform 330; the LNG distributed energy intelligent terminal sends request information for tanking corresponding to the LNG tanker number and the location information of the LNG distributed energy intelligent terminal to the LNG distributed energy management platform 330; the LNG distributed energy management platform 330 performs information matching according to the task plan and issues an instruction for tanking to the LNG tanker and the LNG distributed energy intelligent terminal respectively if the matching succeeds; if the matching fails, the LNG distributed energy management platform 330 sends an alarm to a platform manager; after receiving the instruction, the LNG tanker and the LNG distributed energy intelligent terminal open valves for the tanking respectively.

A process of the information matching performed by the LNG distributed energy management platform 330 according to the tanking task plan specifically includes that: the LNG distributed energy management platform 330 constructs an address matching model and extracts a semantic feature from the location information of the LNG tanker and the location information of the LNG distributed energy intelligent terminal respectively; the LNG distributed energy management platform queries the task plan for tanking stored in a database according to the request information for tanking, and obtains the location information of the LNG distributed energy intelligent terminal and vehicle location information of the LNG tanker in the task plan for tanking; matches the extracted semantic feature with an address of the task plan for tanking in the database for an address text semantic matching, and outputs a matching result.

A process of constructing an address matching model by the LNG distributed energy management platform 330 specifically includes: address dataset division: obtaining address data of historical tanking task plans of the LNG distributed energy management platform 330 to form an address database, constructing a set of address data with a manual marking, and dividing the set of address data into a training set, a verification set, and a testing set; a word vector training for an address element: using a Word2vec model in a gensim natural language processing library to perform a word vector training for the training set in the address database, so as to obtain a word vector of a glossary in a current application context; semantic matching of address text: using an ESIM mode as a basic model of the semantic matching of address text, and performing local modeling according to a contextual dependency relation of the address element to obtain the address matching model; and verification and testing of address matching: performing a verification of address matching on the address matching model according to the verification set, adjusting a count of hidden layer nodes, a learning rate, and a mini-batch size of the model according to a verification result, and finally performing a testing of address matching with the testing set.

A process of a word vector training for an address element specifically includes that: the Word2vec model belongs to an unsupervised neural network language model and adopts the Word2vec model in the natural language processing library to perform the word vector training for the training set in the address database; first performs modeling according to a distribution of a current word and a local context of the word to obtain a word vector of the current word; a model used in a training process is a CBOW model, and a training manner is Negative Sampling; then a glossary of address elements of a corpus and a 256-dimensional word vector corresponding to the corpus are generated.

In some embodiments, the Internet of Things system 300 for managing tanking safety may also be called an Internet of Things system for managing gas stations, and the LNG distributed energy management platform 330 may also be called an energy management platform. The Internet of Things system for managing gas stations also includes an object platform, a sensor network platform, a service platform, and a user platform. The LNG distributed energy user platform 310 may also be called a user platform, the LNG distributed energy service platform 320 may also be called a service platform, the LNG distributed energy logistics transportation sensor network platform 340 and the LNG distributed energy intelligent terminal sensor network platform 350 may also be called a sensor network platform, and the LNG distributed energy logistics transportation object platform 360 and the LNG distributed energy intelligent terminal object platform 370 may also be called an object platform.

In some embodiments, the object platform may be configured to obtain historical gas filling data, and transmit the gas filling data to the energy management platform through the sensor network platform; the sensor network platform may be configured to realize a communication connection for perception and control between the management platform and the object platform; the service platform may be configured to obtain a target delivery plan required by a user from the energy management platform; the user platform may be configured to obtain the target delivery plan from the service platform for the user. For more details, please refer to the related descriptions in FIG. 4 and FIG. 5.

FIG. 4 is a flowchart illustrating an exemplary process for managing a gas station according to some embodiments of the present disclosure. As shown in FIG. 4, a process 400 includes steps 410 to 440. In some embodiments, the process 400 may be performed by an energy management platform.

Step 410, acquiring historical gas filling data of a gas station.

The gas station may also be an LNG distributed energy intelligent terminal. For more information about the LNG distributed energy intelligent terminal, please refer to FIG. 3 and its related descriptions.

The historical gas filling data refers to a plurality of gas filling data corresponding to historical time. The historical gas filling data may be represented by a data sequence. For example, the historical gas filling data may be a sequence composed of historical LNG supply data corresponding to a plurality of historical moments within a period of time before a current moment.

In some embodiments, the energy management platform may obtain the historical gas filling data corresponding to a plurality of historical times of an object platform (such as a gas station) through the sensor network platform.

In some embodiments, the energy management platform may acquire the historical gas filling data based on a preset acquiring time.

The preset acquiring time refers to a preset time length for acquiring the historical gas filling data. In some embodiments, the preset acquiring time may include an acquiring period for acquiring the historical gas filling data. The acquiring period refers to an acquiring time interval.

In some embodiments, the historical gas filling data may also include terminal operation information. The terminal operation information refers to information related to a terminal operation. In some embodiments, the terminal operation information may include at least one of location information or storage data of the gas station.

In some embodiments, the location information refers to a location where the gas station is located. For example, the location information may be a current location of the gas station. For more information about the location information, please refer to FIG. 2 and its related descriptions.

In some embodiments, the energy management platform may acquire the historical gas filling data in various ways. For example, the energy management platform may periodically acquire the historical gas filling data based on the preset acquiring time through a perceiving and acquiring device, or the like.

step 420, determining LNG demand data at at least one future moment based on the historical gas filling data.

The LNG demand data refers to a predicted value of LNG usage at the at least one future moment. For example, the LNG demand data may be a value of LNG usage corresponding to at least one time point within a period of time after the current moment. In some embodiments, the LNG demand data may be represented by an LNG demand data curve. A horizontal coordinate of the LNG demand data curve may be the at least one future moment, and vertical coordinates may be LNG demand data corresponding to each future moment.

In some embodiments, the energy management platform may determine the LNG demand data at the at least one future moment in various ways based on the historical gas filling data. For example, the energy management platform may determine the LNG demand data at the at least one future moment by querying a first preset table. The first preset table includes corresponding data of the historical gas filling data and the LNG demand data of at the at least one future moment. The energy management platform may determine the LNG demand data at the at least one future moment through the first preset table and historical gas filling data.

In some embodiments, the energy management platform may predict the LNG demand data at the at least one future moment and a predicted confidence level of the LNG demand data at the at least one future moment based on historical gas filling data acquired at the current time and/or at least one historical moment.

The predicted confidence level of the LNG demand data at the at least one future moment refers to a degree of credibility of at least one predicted future moment and/or a degree of credibility of the LNG demand data at the at least one future moment.

In some embodiments, the energy management platform may predict the LNG demand data at the at least one future moment in various ways based on the historical gas filling data acquired at the current moment and/or the at least one historical moment. For example, the energy management platform may determine the LNG demand data at the at least one future moment based on a preset conversion relationship according to the historical gas filling data between the current moment and the at least one historical moment. The preset conversion relationship refers to a preset relationship between the historical gas filling data and LNG demand data at a future moment.

In some embodiments, the energy management platform may determine the LNG demand data at the at least one future moment through a prediction model based on the historical gas filling data acquired at the current moment and/or the at least one historical moment.

In some embodiments, the prediction model may be a model that determines the LNG demand data at the at least one future moment. In some embodiments, the prediction model may be a machine learning model. For example, the prediction model may be any model for prediction such as a neural network model (NN), a recurrent neural network (RNN), or any combination thereof.

In some embodiments, the prediction model may be obtained by training based on a plurality of first training samples with labels.

In some embodiments, each group of training samples of the first training sample may include historical gas filling data at a first sample historical moment and historical gas filling data acquired at at least a second sample historical moment. The at least one second sample historical moment is located before a first sample historical moment. The labels may include actual gas filling data at a third sample historical moment corresponding to each group of training samples. The third sample historical moment is located after the first sample historical moment and is a future moment relative to the first sample historical moment. In some embodiments, the first training samples may be obtained based on historical data. Labels of the first training sample may be obtained by automatic or manual labeling.

In some embodiments of the present disclosure, determining the LNG demand data at the at least one future moment based on the prediction model can determine the LNG demand data at the at least one future moment more accurately in combination with an actual situation, and reduce the human cost and waste of resources required for human assessment and determination. In some embodiments, the prediction model may have a multi-layer structure, for details, please refer to the relevant description in FIG. 5.

In some embodiments, the prediction model may also include a confidence level determination layer. In some embodiments, the energy management platform may determine the predicted confidence level of the LNG demand data at the at least one future moment through the confidence level determination layer. For more details, please refer to the related description of FIG. 5.

In some embodiments, the energy management platform may also determine a reference time point based on the LNG demand data at the at least one future moment.

The reference time point refers to a time point when the LNG demand data reaches a preset alarm threshold. The preset alarm threshold may include a minimum threshold for safe use of LNG under normal conditions. In some embodiments, the preset alarm threshold may be a system default value, an experience value, or the like.

In some embodiments, the energy management platform may determine the reference time point in various ways. For example, the energy management platform may determine the reference time point through the preset alarm threshold. For example, the energy management platform may determine a future moment when the LNG demand data reaches and/or exceeds the preset alarm threshold for the first time as the reference time point.

In some embodiments, the energy management platform may also re-determine the preset acquiring time based on a time difference between the reference time point and the current moment.

In some embodiments, the energy management platform may preset a corresponding relationship between the time difference between the reference time point and the current moment and the preset acquiring time in advance. The energy management platform may re-determine the preset acquiring time based on the corresponding relationship, the time difference between the reference time point and the current moment. The preset acquiring time may be proportional to the time difference between the reference time point and the current moment.

In some embodiments, the energy management platform may re-determine the preset acquiring time based on a first threshold. The first threshold refers to a maximum value of a time difference between a reference time point at which the preset acquiring time needs to be re-determined and the current moment. For example, the energy management platform may compare the time difference between the reference time point and the current moment with the first threshold, and when the time difference between the reference time point and the current moment is less than or equal to the first threshold, the energy management platform may re-determine the preset acquiring time.

For example, if an original preset acquiring time is an acquiring period T1 (e.g., T1 is 12 hours), that is, the gas station acquires terminal operation information every T1, the current time is t0, and five future moments corresponding to the current time are respectively $t1=t0+T1$, $t2=t0+2T1$, $t3=t0+3T1$, $t4=t0+4T1$, $t5=t0+5T1$. If t3 is a determined reference time point, that is, LNG demand data corresponding to the t3 reaches and/or exceeds the preset alarm threshold for the first time, then a time difference between t3 and t0 is 3T1. If 3T1 is less than and/or equal to the first threshold, the gas station may re-determine the preset acquiring time as an acquiring period T2, wherein $T2<T1$.

In some embodiments, the first threshold may be a system default value, an experience value, an artificial preset value, etc., or any combination thereof, and may be set according to actual need. The first threshold may also be determined in other ways, which is not limited herein.

In some embodiments of the present disclosure, the energy management platform may re-determine the preset acquiring time based on the time difference between the reference time point and the current moment, and may adjust the preset acquiring time in combination with an actual LNG demand situation to improve the accuracy and acquiring efficiency of LNG demand data, so as to ensure the safe use of LNG and improve the service experience of users.

In some embodiments, the energy management platform may also determine whether the at least one future moment is a reliable moment based on the predicted confidence level of the LNG demand data at the at least one future moment.

In some embodiments, the energy management platform may determine at least one future moment with a predicted confidence level higher than a confidence level threshold as the reliable moment.

In some embodiments, the confidence level threshold may be a system default value, an experience value, an artificial preset value, etc., or any combination thereof, and may be set according to actual need. The confidence level threshold may also be determined in other ways, which is not limited herein.

In some embodiments of the present disclosure, the energy management platform may determine at least one future moment with a predicted confidence level higher than the confidence level threshold as the reliable moment, which is conducive to improving the accuracy of a target delivery plan subsequently determined.

In some embodiments of the present disclosure, the energy management platform acquiring the historical gas filling data based on the preset acquiring time; predicting the LNG demand data at the at least one future moment based on the historical gas filling data acquired at the current moment and/or the at least one historical moment can realize the prediction of the LNG demand data, and replenish the storage in time when the storage is insufficient, ensuring the safety of use and supply of LNG and improving the user's service experience.

Step 430, determining at least one set of candidate delivery plans based on the LNG demand data and LNG storage data.

The LNG storage data refers to data related to LNG storage. For example, the LNG storage data may include a type of storage and storage data. The storage data refers to a storage volume of LNG at the gas station. In some embodiments, the energy management platform may obtain the storage data of the gas station regularly or in real time through the sensor network platform.

The candidate delivery plan refers to an alternative plan for LNG delivery. For example, the candidate delivery plan may include at least one delivery volume of LNG delivered to the gas station at at least one future moment. The candidate delivery plan may also refer to a request for tanking. For more information on the request for tanking, please refer to FIG. 1, FIG. 2, and their related descriptions.

In some embodiments, the energy management platform may determine the at least one set of candidate delivery plans based on the LNG demand data and the LNG storage data in various ways. For example, the energy management platform may determine the at least one set of candidate delivery plans through random generation based on the LNG demand data and the LNG storage data. As another example, the LNG demand data and LNG storage data may be represented by a data vector. The energy management platform may calculate a vector distance between the data vector and a historical data vector corresponding to historical LNG demand data and historical LNG storage data, and determine at least one set of historical delivery plans whose vector distance is less than a preset threshold as the at least one set of candidate delivery plans. The preset threshold refers to a minimum vector distance between a preset data vector and the historical data vector.

Step 440: determining a target delivery plan based on at least one gas filling cost data of the at least one set of candidate delivery plans.

The gas filling cost data refers to cost data related to the supply of LNG at the gas station and/or the storage of LNG at the gas station, etc. Different candidate delivery plans correspond to different gas filling cost data.

In some embodiments, the at least one gas filling cost data may at least include an LNG delivery cost and an LNG storage cost. The at least one gas filling cost data may be represented by a comprehensive gas filling cost at a plurality of consecutive time points, and the at least one gas filling cost data is determined based on a preset algorithm.

The LNG delivery cost refers to a delivery cost of LNG from a production site to the gas station, which may be related to a delivery distance or the like. The LNG storage cost refers to a cost of storing LNG, which may relate to the storage data, a storage time, or the like. For example, the LNG delivery cost may be P yuan/km/kg, and the LNG storage cost may be Q yuan/day/kg.

In some embodiments, the LNG delivery cost may also include a transferring cost of LNG. The transferring cost of LNG refers to a cost of transferring LNG into the gas station, which may be related to a volume of transferring LNG transferred and a count of transferring. For example, the transferring cost of LNG may be represented as a fixed cost of each transferring of LNG×a count of transferring+a cost of transferring 1 kg of LNG×a volume of transferring LNG.

In some embodiments, the at least one gas filling cost data may be obtained by querying historical gas filling cost data.

In some embodiments, the at least one gas filling cost data may be represented by the comprehensive gas filling cost at the plurality of consecutive time points. For example, the energy management platform may count a gas filling cost at the plurality of consecutive time points, and determine the counted gas filling cost at the plurality of consecutive time points as the at least one gas filling cost data. The consecutive time points refer to a plurality of time points within a period of time after the current moment.

In some embodiments, the at least one gas filling cost data may be determined based on the preset algorithm. The preset algorithm may include a K nearest neighbor algorithm, a Bayesian algorithm, or the like.

In some embodiments, the preset algorithm may be related to the predicted confidence level of the LNG demand data at the at least one future moment. For example, the preset algorithm may be represented by the following equation (1):

$$\text{Cost}=[R_0-(\Sigma_{k=1}{}^n D_k)\times\alpha]\times\sigma+(T1+T2)\times\beta \tag{1}$$

Where Cost denotes a gas filling cost data at $t_0$, $R_0$ denotes storage data at the current moment, $\Sigma_{k=1}{}^n D_k$ denotes an accumulated value of LNG demand data corresponding to future moments $t_1 \sim t_k$ (k is an integer between 1 to n), $\alpha$ denotes a confidence level coefficient, and $\sigma$ denotes a gas filling cost per unit, T1 denotes a cost of one LNG transportation, T2 denotes a cost of one transfer of LNG, and β denotes a count of transfers. The $t_0$ may be a future moment after the current moment.

In some embodiments, the confidence level coefficient α is positively correlated with a predicted confidence level.

In some embodiments of the present disclosure, the preset algorithm is related to the predicted confidence level of the LNG demand data at the at least one future moment, which can further improve the accuracy of determining the gas filling cost data.

In some embodiments of the present disclosure, the at least one gas filling cost data comprehensively considers the LNG delivery cost and LNG storage cost, which can improve the accuracy of the gas filling cost data to a certain extent, thereby reducing an error in determining the LNG demand data at the at least one future moment.

In some embodiments, the energy management platform may determine gas filling cost data corresponding to different future moments respectively based on the at least one future moment included in the candidate delivery plan, and determine a sum of gas filling costs data at all future moments included in the candidate delivery plan as gas filling cost data of the candidate delivery plan.

The target delivery plan refers to an optimal delivery plan among the at least one set of candidate delivery plans. For example, the target delivery plan may be a delivery plan with a lowest gas filling cost data among the at least one set of candidate delivery plans.

In some embodiments, the energy management platform may select a delivery plan from the at least one set of candidate delivery plans as the target delivery plan. For example, the energy management platform may rank the at least one set of candidate delivery plans based on the at least one gas filling cost data, and determine the highest-ranked candidate delivery plan (with the smallest gas filling cost data) as the target delivery plan.

In some embodiments of the present disclosure, determining LNG demand data at a future moment can predict LNG demand data in the future, further determine the delivery plan and replenish storage when LNG storage is insufficient, henceforth ensuring the normal use of LNG, reducing the cost of gas filling, and improving user's service experience.

In some embodiments, the energy management platform may determine the at least one gas filling cost data of the at least one set of candidate delivery plans based on the preset algorithm; determine at least one optimal delivery plan based on the at least one gas filling cost data; and determine the target delivery plan based on the at least one optimal delivery plan and the reliable moment.

The optimal delivery plan refers to a candidate delivery plan that satisfies a first preset condition among the at least one set of candidate delivery plans. The first preset condition refers to a condition that the gas filling cost data needs to satisfy. The first preset condition may be that the gas filling cost data is less than a preset value or within a preset range. The energy management platform may determine a candidate delivery plan whose gas filling cost data is less than the preset value or within the preset range as the optimal delivery plan among the at least one set of candidate delivery plans. The optimal delivery plan may include a volume of LNG delivered to the gas station at the at least one future moment and at different future moments.

The reliable moment refers to a corresponding future time when the predicted confidence level of the LNG demand data satisfies a second preset condition. The second preset condition refers to that the predicted confidence level is greater than the confidence level threshold. For example, the reliable moment may be at least one future moment when the predicted confidence level of the LNG demand data satisfies the second preset condition.

In some embodiments, the energy management platform may rank the at least one set of candidate delivery plans based on the at least one gas filling cost data, and determine top few candidate delivery plans with a relatively higher ranking (with relatively smaller gas filling cost data) as the optimal delivery plans.

In some embodiments, the energy management platform may determine whether at least one future moment included in each plan of the at least one optimal delivery plan is a reliable moment. The energy management platform may determine an optimal delivery plan that contains a largest count of reliable moments as the target delivery plan. For more information about determining whether the at least one future moment is the reliable moment and the reliable moment, please refer to the related description of step 420.

The energy management platform may determine whether the at least one future moment is the reliable moment, and determine the target delivery plan based on a determination result. For more details about that the energy management platform may determine whether at least one future moment is the reliable moment, please refer to the related description of step 420.

The determination result refers to a result including whether at least one future moment in the optimal delivery plan is the reliable time and a count of reliable moments.

In some embodiments, the energy management platform may determine the target delivery plan based on the determination result.

For example, the energy management platform may determine the target delivery plan by considering gas filling cost data corresponding to the optimal delivery plan and a count of reliable moments included in the optimal delivery plan. The count of reliable moments refers to a count of the at least one future moment included in the optimal delivery plan that is the reliable moment. The energy management platform may determine whether the at least one future moment included in the optimal delivery plan is the reliable moment, and then further determine the count of reliable moments. For more details about determining whether the at least one future moment is the reliable moment, please refer to the relevant description of step 420.

For example, the energy management platform may determine an evaluation value of the gas filling cost data and an evaluation value of the count of reliable moments based on a second preset table, calculate a comprehensive evaluation value by weighting and determine an optimal delivery plan with a minimum comprehensive evaluation value as the target delivery plan. Determining the gas filling cost data corresponding to the optimal delivery plan is similar to determining the at least one gas filling cost data of the at least one set of candidate delivery plans, for more details, please refer to the relevant description in step 440.

The second preset table may include evaluation value corresponding to the gas filling cost data and evaluation value corresponding to the count of reliable moments respectively. The energy management platform may preset the second preset table in advance. Weights may be preset according to actual need.

In some embodiments of the present disclosure, determining the at least one optimal delivery plan based on at least one gas filling cost data, and determining the target delivery plan based on the at least one optimal delivery plan and reliable moment can make the target delivery plan more suitable for actual need and cost requirement of a user. In some embodiments of the present disclosure, the count of reliable moments is taken into account when determining the target delivery plan, which can improve the reliability and flexibility of the target delivery plan and avoid affecting the supply-demand balance of the gas station due to an error of the LNG demand data, causing a large fluctuation of the gas filling cost.

Figure 5:
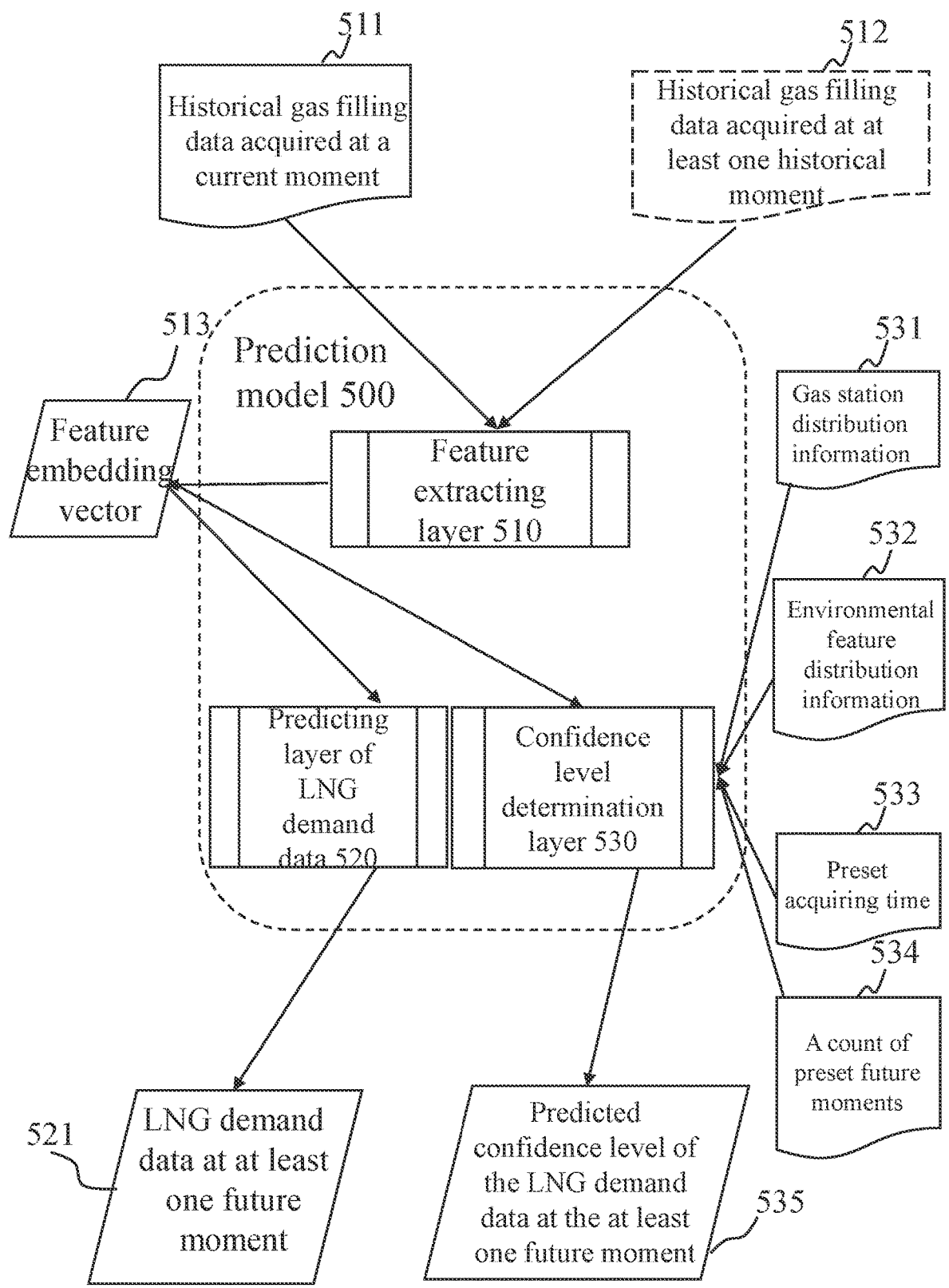
FIG. 5 is a flowchart illustrating an exemplary process for determining LNG demand data at a future moment and a predicted confidence level of the LNG demand data through a prediction model according to some embodiments of the present disclosure.

FIG. 5 is a flowchart illustrating an exemplary process for determining LNG demand data at a future moment and a predicted confidence level of the LNG demand data through a prediction model according to some embodiments of the present disclosure.

In some embodiments, a prediction model 500 may include a feature extracting layer 510 and a predicting layer of LNG demand data 520.

In some embodiments, the energy management platform may determine a feature embedding vector 513 through the feature extracting layer 510 based on historical gas filling data 511 acquired at a current moment and/or historical gas filling data 512 acquired at at least one historical moment. The energy management platform may determine LNG demand data 521 at at least one future moment through the predicting layer 520 of LNG demand data based on the feature embedding vector 513.

In some embodiments, the feature extracting layer 510 may include a machine learning model. For example, the feature extracting layer 510 may be a model such as CNN or RNN.

The feature embedding vector 513 refers to a vector generated after a format conversion of the historical gas filling data 511 acquired at the current moment and/or the historical gas filling data 512 acquired at the at least one historical moment. For example, the historical gas filling data 511 acquired at the current moment and/or the historical gas filling data 512 acquired at the at least one historical moment are converted into a data format that can be processed by an Internet of Things system for managing gas stations, and then the corresponding feature embedding vector 513 is generated based on the converted data format.

In some embodiments, the predicting layer of LNG demand data 520 may include a machine learning model. For example, the predicting layer of LNG demand data 520 may be a model such as CNN or RNN.

In some embodiments, the feature extracting layer 510 and the predicting layer of LNG demand data 520 may be obtained through a joint training. In some embodiments, each set of training samples of second training samples for the joint training may include historical gas filling data at a fourth sample historical moment and historical gas filling data acquired at at least one fifth sample historical moment. The at least one fifth sample historical moment is located before the fourth sample historical moment. Labels may include actual historical gas filling data at a sixth sample historical moment corresponding to each set of training samples. The sixth sample historical moment is located after the fourth sample historical moment and is a future moment relative to the fourth sample historical moment. In some embodiments, the second training sample may be obtained based on historical data. Labels of the second training samples may be obtained by automatic or manual labeling.

The historical gas filling data at the fourth sample historical moment and the historical gas filling data acquired at the fifth sample historical moment are input to the feature extracting layer 510 to obtain the feature embedding vector 513 output by the feature extracting layer 510; the feature embedding vector 513 output by the feature extracting layer 510 is determined as a training sample, and the training sample to the predicting layer of LNG demand data 520 is inputted to obtain LNG demand data at the sixth sample historical moment output by the predicting layer of LNG demand data 520.

Based on the labels and an output of the predicting layer of LNG demand data 520, a loss function is constructed. At the same time, parameters of the feature extracting layer 510 and the predicting layer of LNG demand data 520 are updated, then a trained feature extracting layer 510 and a trained predicting layer of LNG demand data 520 are obtained through parameter updating.

In some embodiments of the present disclosure, LNG demand data 521 at the at least one future moment is obtained by processing the historical gas filling data acquired at the current time and/or at the at least one historical time through the feature extracting layer 510 and the predicting layer of LNG demand data 520, which is beneficial to solve the problem of difficulty in obtaining labels when training the feature extracting layer 510 alone. In addition, the feature extracting layer 510 and the predicting layer of LNG demand data 520 of the joint training can not only reduce a count of required samples but also improve the efficiency of the training.

In some embodiments, the prediction model 500 may also include a confidence level determination layer 530.

In some embodiments, the energy management platform may determine predicted confidence level of the LNG demand data at the at least one future moment 535 through the confidence level determination layer 530 based on the feature embedding vector 513, gas station distribution information 531, environmental feature distribution information 532, a preset acquiring time 533, and a count of preset future moments 534.

In some embodiments, the confidence level determination layer 530 may include a machine learning model. For example, the confidence level determination layer 530 may be a model such as CNN or RNN.

The gas station distribution information 531 refers to information related to distribution of a gas station. For example, the gas station distribution information 531 may include a location of the gas station and a density or count of gas stations within a certain area where the gas station locates.

The environmental feature distribution information 532 refers to information related to distribution of environmental features of gas stations at different locations at different moments. For example, environmental feature distribution information includes environmental features (e.g., temperature, humidity) of a gas station at a location n at a moment tn, wherein n may be an integer greater than or equal to 1, indicating environmental features of the gas station at different locations and at different moments.

The count of preset future moments 534 refers to a count of preset future moments that need to be predicted. For example, the count of preset future moments is five, and outputs of the confidence level determination layer 530 may include predicted confidence levels of LNG demand data at the five future moments.

In some embodiments, an output of the feature extracting layer 510 may be an input of the confidence level determination layer 530, and the feature extracting layer 510 and the confidence level determination layer may be obtained through a joint training. For a process of the joint training of the feature extracting layer 510 and the confidence level determination layer 530, please refer to a process of the joint training of the feature extracting layer 510 and the predicting layer of LNG demand data 520.

In some embodiments, each set of training samples of third training samples for the joint training may include historical gas filling data at a seventh sample historical moment, historical gas filling data acquired at at least one eighth sample historical moment, and sample gas station distribution information, sample environmental feature distribution information, a sample preset acquiring time, and a count of sample preset future moments. Labels may include a sample actual confidence level of LNG demand data. The at least one eighth sample historical moment is located before the seventh sample historical moment. The sample actual confidence of the LNG demand data may correspond to a ninth sample historical moment of each set of training samples. In some embodiments, the third training samples may be obtained based on historical data. The ninth sample historical moment is located after the seventh sample historical moment and is a future moment relative to the seventh sample historical moment. Labels of the third training sample may be obtained by automatic or manual labeling. For example, when LNG demand data at the ninth sample historical moment corresponding to the seventh sample historical moment is more similar to actual LNG demand data, a corresponding sample actual confidence level is closer to 1, otherwise, a corresponding sample actual confidence level is closer to 0.

In some embodiments of the present disclosure, by determining the predicted confidence level of the LNG demand data at the at least one future moment through the feature extracting layer 510 and the confidence level determination layer 530, it is beneficial to lay a foundation for subsequently determining a target delivery plan and improving the accuracy of the delivery plan. In some embodiments, the feature extracting layer 510 and the confidence level determination layer 530 can solve the problem that it is difficult to obtain labels when the feature extracting layer 510 is trained alone. In addition, jointly training the feature extracting layer 510 and the confidence level determination layer 530 can not only reduce a count of required samples but also improve the efficiency of the training.

The basic principles, main features, and advantages of the present disclosure have been shown and described above. Those skilled in the art should understand that the present disclosure is not limited by the above-mentioned embodiments. What is described in the above-mentioned embodiments and the description only illustrates the principle of the present disclosure. Without departing from the spirit and scope of the present disclosure, the present disclosure may also have possible variations and improvements, which fall within the scope of the claims of the present disclosure as well. The scope of the claims of the present disclosure is defined by the appended claims and their equivalents.

What is claimed is:

1. A method for liquefied natural gas (LNG) station management, executed through an energy management platform of an Internet of Things system for LNG station management, the Internet of Things system comprising an object platform, a sensor network platform, the energy management platform, a service platform, and a user platform, wherein the sensor network platform is configured to realize communication connection between the energy management platform and the object platform; the object platform includes an LNG tanker and an LNG distributed energy intelligent terminal, wherein the object platform is configured to perceive and acquire vehicle information of the LNG tanker and terminal operation information of the LNG distributed energy intelligent terminal, and the LNG distributed energy intelligent terminal is configured to perceive and acquire location information and LNG storage information of the LNG distributed energy intelligent terminal with a perceiving and acquiring device; the energy management platform is configured to perform real-time tracking and monitoring on a driving path of the LNG tanker; the service platform is configured to obtain the vehicle information of the LNG tanker and the location information of the LNG distributed energy intelligent terminal through the energy management platform; and the user platform is configured to obtain the vehicle information of the LNG tanker and the terminal operation information of the LNG distributed energy intelligent terminal from the service platform for various users; the method comprising: acquiring, by the object platform, historical gas filling data of a gas station based on a preset acquiring time, and transmitting the historical gas filling data to the energy management platform through the sensor network platform; determining, by the energy management platform, LNG demand data at at least one future moment and a predicted confidence level of the LNG demand data based on the historical gas filling data through a prediction model, wherein the prediction model includes a feature extracting layer, a predicting layer of LNG demand data, and a confidence level determination layer, wherein an input of the feature extracting layer includes historical gas filling data acquired at a current moment or historical gas filling data acquired at at least one historical moment, and an output includes a feature embedding vector; an input of the predicting layer of LNG demand data includes the feature embedding vector, and an output includes the LNG demand data at the at least one future moment; and an input of the confidence level determination layer includes the feature embedding vector, gas station distribution information, environmental feature distribution information, the preset acquiring time, and a count of preset future moments, and an output includes the predicted confidence level of the LNG demand data at the at least one future moment; wherein the feature extracting layer and the predicting layer of LNG demand data are obtained through a first joint training based on first training samples and first labels; wherein each set of the first training samples for the first joint training includes historical gas filling data at a first sample historical moment and historical gas filling data acquired at at least one second sample historical moment, wherein the at least one second sample historical moment is located before the first sample historical moment; the first labels include actual historical gas filling data at a third sample historical moment corresponding to each set of the first training samples, wherein the third sample historical moment is located after the first sample historical moment and is a future moment relative to the first sample historical moment; the first training samples are obtained based on historical data, and the first labels are obtained by automatic or manual labeling; and the feature extracting layer and the confidence level determination layer are obtained through a second joint training based on second training samples and second labels, wherein each set of training samples of the second training samples for the second joint training includes the historical gas filling data at the first sample historical moment, the historical gas filling data acquired at at least one second sample historical moment, sample gas station distribution information, sample environmental feature distribution information, a sample preset acquiring time, and a count of sample preset future moments; and the second labels include a sample actual confidence level of the LNG demand data, and the second labels are obtained by automatic or manual labeling; determining, by the energy management platform, a reliable moment based on the predicted confidence level; determining, by the energy management platform, at least one set of candidate delivery plans based on the LNG demand data and LNG storage data; determining, by the energy management platform, a target delivery plan based on at least one piece of gas filling cost data of the at least one set of candidate delivery plans and the reliable moment; wherein the at least one piece of gas filling cost data includes at least an LNG delivery cost and an LNG storage cost; the at least one piece of gas filling cost data is represented by a comprehensive gas filling cost at a plurality of consecutive time points; and the at least one piece of gas filling cost data is determined based on a preset algorithm, the preset algorithm including a confidence level coefficient that is related to the predicted confidence level; obtaining, by the service platform, the target delivery plan required by the users from the energy management platform; and obtaining, by the user platform, the target delivery plan fed back to the users from the service platform.

2. The method according to claim 1, wherein the determining a target delivery plan based on at least one piece of gas filling cost data of the at least one set of candidate delivery plans and the reliable moment includes:
determining the at least one piece of gas filling cost data of the at least one set of candidate delivery plans based on the preset algorithm;
determining at least one optimal delivery plan based on the at least one piece of gas filling cost data; and
determining the target delivery plan based on the at least one optimal delivery plan and the reliable moment.

3. The method according to claim 2, wherein the determining the target delivery plan based on the at least one optimal delivery plan and the reliable moment includes:
determining whether at least one future moment included in the at least one optimal delivery plan is a reliable moment, determining a count of reliable moments; and
determining the target delivery plan based on gas filling cost data and the count of reliable moments of the at least one optimal delivery plan.

4. The method according to claim 1, wherein the reliable moment is at least one future moment when the predicted confidence level is greater than a confidence threshold.

5. The method according to claim 1, wherein the preset acquiring time includes an acquiring period for acquiring the historical gas filling data, and the method further comprises:
determining the preset acquiring time based on a time difference between a reference time point and the current moment; the reference time point being a time point when the LNG demand data reaches a preset alarm threshold.

6. The method according to claim 1, wherein
the object platform is further configured to generate a request for tanking based on the terminal operation information and transmit the request for tanking to the energy management platform through the sensor network platform;
the LNG distributed energy intelligent terminal is further configured to generate the request for tanking when LNG storage is lower than a preset alarm threshold, and send the request for tanking and the location information to the energy management platform;
the energy management platform is further configured to generate a task plan for tanking based on the acquired vehicle information of the LNG tanker and the terminal operation information of the LNG distributed energy intelligent terminal, send the task plan for tanking to the LNG tanker and the LNG distributed energy intelligent terminal respectively, and perform real-time tracking and monitoring on a driving path of the LNG tanker;
the energy management platform is further configured to obtain the vehicle information of the LNG tanker currently in communication with the energy management platform after receiving the request for tanking and location information of the LNG distributed energy intelligent terminal, wherein the vehicle information includes a tanker number, vehicle location information, and vehicle speed information; obtain a tanker number and vehicle location information of an LNG tanker with a shortest transportation time from the LNG distributed energy intelligent terminal according to a shortest time matching principle, generate the task plan for tanking and send the task plan for tanking to the LNG tanker and the LNG distributed energy intelligent terminal respectively; and
the service platform is further configured to obtain the vehicle information of the LNG tanker and the terminal operation information of the LNG distributed energy intelligent terminal in a process of LNG tanking required by the users from the energy management platform.

7. The method according to claim 1, wherein the first joint training of the feature extracting layer and the predicting layer of LNG demand data by the energy management platform includes:
inputting the historical gas filling data at the first sample historical moment and the historical gas filling data acquired at the at least one second sample historical moment to an initial feature extracting layer to output a feature embedding vector as a training sample;
inputting the training sample to an initial predicting layer of LNG demand data to output LNG demand data at the third sample historical moment;
constructing a loss function based on the first labels and an output of the predicting layer of LNG demand data;
updating parameters of the initial feature extracting layer and the initial predicting layer of LNG demand data; and
obtaining the feature extracting layer and the predicting layer of LNG demand data.

8. The method according to claim 1, wherein the second joint training of the feature extracting layer and the confidence level determination layer by the energy management platform includes:
inputting the historical filling data at the first sample historical moment and the historical filling data acquired at the at least one second sample historical moment to an initial feature extraction layer to output a feature embedding vector;
taking the sample gas station distribution information, the sample environmental feature distribution information, the sample preset acquiring time, the count of sample preset future moments, and the feature embedding vector as training samples;
inputting the training samples into an initial confidence determination layer to output an estimated confidence level of the LNG demand data at the third sample historical time;
constructing a loss function based on the second labels and the output of the initial confidence determination layer;
updating parameters of the initial feature extraction layer and the initial confidence determination layer; and obtaining the feature extraction layer and the confidence determination layer.

9. An Internet of Things (IoT) system for liquefied natural gas (LNG) station management, comprising an object platform, a sensor network platform, an energy management platform, a service platform, and a user platform, wherein the sensor network platform is configured to realize communication connection between the energy management platform and the object platform; the object platform includes an LNG tanker and an LNG distributed energy intelligent terminal, wherein the object platform is configured to perceive and acquire vehicle information of the LNG tanker and terminal operation information of the LNG distributed energy intelligent terminal; the object platform is configured to acquire historical gas filling data of a gas station based on a preset acquiring time, and transmit the historical gas filling data to the energy management platform through the sensor network platform; the LNG distributed energy intelligent terminal perceives and acquires location information and LNG storage information of the LNG distributed energy intelligent terminal with a perceiving and acquiring device; the energy management platform is configured to perform real-time tracking and monitoring on a driving path of the LNG tanker; the service platform is configured to obtain the vehicle information of the LNG tanker and the location information of the LNG distributed energy intelligent terminal through the energy management platform; and the user platform is configured to obtain the vehicle information of the LNG tanker and the terminal operation information of the LNG distributed energy intelligent terminal from the energy service platform for various users; the energy management platform is further configured to perform following operations including: determining LNG demand data at at least one future moment and a predicted confidence level of the LNG demand data based on the historical gas filling data through a prediction model, wherein the prediction model includes a feature extracting layer, a predicting layer of LNG demand data and a confidence level determination layer, wherein an input of the feature extracting layer includes historical gas filling data acquired at a current moment or historical gas filling data acquired at at least one historical moment, and an output includes a feature embedding vector; an input of the predicting layer of LNG demand data includes the feature embedding vector, and an output includes the LNG demand data at the at least one future moment; and an input of the confidence level determination layer includes the feature embedding vector, gas station distribution information, environmental feature distribution information, the preset acquiring time, and a count of preset future moments, and an output includes the predicted confidence level of the LNG demand data at the at least one future moment; wherein the feature extracting layer and the predicting layer of LNG demand data are obtained through a first joint training based on second training samples and first labels; wherein each set of the second training samples for the first joint training includes historical gas filling data at a fourth sample historical moment and historical gas filling data acquired at at least one fifth sample historical moment, wherein the at least one fifth sample historical moment is located before the fourth sample historical moment; the first labels include actual historical gas filling data at a sixth sample historical moment corresponding to each set of training samples, wherein the sixth sample historical moment is located after the fourth sample historical moment and is a future moment relative to the fourth sample historical moment; the second training sample is obtained based on historical data; and the first labels of the second training samples is obtained by automatic or manual labeling; and the feature extracting layer and the confidence level determination layer are obtained through a second joint training based on third training samples and second labels, wherein each set of training samples of the third training samples for the second joint training includes historical gas filling data at a seventh sample historical moment, historical gas filling data acquired at at least one eighth sample historical moment, and sample gas station distribution information, sample environmental feature distribution information, a sample preset acquiring time, and a count of sample preset future moments; and the second labels include a sample actual confidence level of LNG demand data; and determining a reliable moment based on the predicted confidence level; determining at least one set of candidate delivery plans based on the LNG demand data and LNG storage data; and determining a target delivery plan based on at least one piece of gas filling cost data of the at least one set of candidate delivery plans and the reliable moment; wherein the at least one piece of gas filling cost data includes at least an LNG delivery cost and an LNG storage cost; the at least one piece of gas filling cost data is represented by a comprehensive gas filling cost at a plurality of consecutive time points; and the at least one piece of gas filling cost data is determined based on a preset algorithm, the preset algorithm including a confidence level coefficient that is related to the predicted confidence level; the service platform is further configured to obtain the target delivery plan required by the users from the energy management platform; and the user platform is further configured to obtain the target delivery plan fed back to the users from the service platform.

10. The Internet of Things system according to claim 9, wherein the energy management platform is further configured to perform following operations including:
    determining the at least one piece of gas filling cost data of the at least one set of candidate delivery plans based on the preset algorithm;
    determining at least one optimal delivery plan based on the at least one piece of gas filling cost data; and
    determining the target delivery plan based on the at least one optimal delivery plan and the reliable moment.

11. The Internet of Things system according to claim 10, wherein the energy management platform is further configured to perform following operations including:
    determining whether at least one future moment included in the at least one optimal delivery plan is a reliable moment, determining a count of reliable moments; and
    determining the target delivery plan based on gas filling cost data and the count of reliable moments of the at least one optimal delivery plan.

12. The Internet of Things system according to claim 9, wherein the reliable moment is at least one future moment when the predicted confidence level is greater than a confidence threshold.

13. The Internet of Things system according to claim 9, wherein the preset acquiring time includes an acquiring period for acquiring the historical gas filling data, and the energy management platform is further configured to perform following operations including:
    determining the preset acquiring time based on a time difference between a reference time point and the current moment; the reference time point being a time point when the LNG demand data reaches a preset alarm threshold.

14. A non-transitory computer-readable storage medium storing computer instructions, wherein when reading the computer instructions in the storage medium, a computer implements the method according to claim 1.

\* \* \* \* \*